United States Patent [19]

Nagai et al.

[11] Patent Number: 5,075,169
[45] Date of Patent: Dec. 24, 1991

[54] PLATE-LIKE COMPOSITE FERRITE PARTICLES FOR MAGNETIC RECORDING AND PROCESS FOR PRODUCING THE SAME

[75] Inventors: Norimichi Nagai; Norio Sugita, both of Hiroshima, Japan

[73] Assignee: Toda Kogyo Corp., Hiroshima, Japan

[21] Appl. No.: 358,019

[22] Filed: May 30, 1989

[30] Foreign Application Priority Data

Jun. 8, 1988 [JP] Japan .................. 63-142707
Jul. 28, 1988 [JP] Japan .................. 63-189951

[51] Int. Cl.$^5$ .............................. B32B 9/00
[52] U.S. Cl. .................... 428/402; 428/403; 428/694; 252/62.59
[58] Field of Search ............ 428/403, 402, 694; 252/62.59

[56] References Cited

U.S. PATENT DOCUMENTS

| | | | |
|---|---|---|---|
| 3,770,500 | 11/1973 | Imaoka et al. | 117/237 |
| 4,341,648 | 7/1982 | Kubo et al. | 252/62.63 |
| 4,529,524 | 7/1985 | Nagai et al. | |
| 4,548,801 | 10/1985 | Nagai et al. | |
| 4,561,988 | 12/1985 | Nagai et al. | |
| 4,584,242 | 4/1986 | Nagai et al. | |
| 4,585,568 | 4/1986 | Nagai et al. | |
| 4,664,831 | 5/1987 | Hibst et al. | 252/62.59 |
| 4,698,182 | 2/1987 | Nagai et al. | |
| 4,752,407 | 6/1988 | Nagai et al. | |
| 4,778,734 | 10/1988 | Ohdan et al. | 428/694 |
| 4,781,981 | 11/1988 | Katamoto et al. | |
| 4,789,494 | 12/1988 | Aoki et al. | 252/62.59 |
| 4,806,429 | 2/1989 | Nagai et al. | 428/403 |
| 4,828,916 | 7/1989 | Yamamoto et al. | |
| 4,886,714 | 12/1989 | Torii et al. | 428/694 |

FOREIGN PATENT DOCUMENTS

| | | |
|---|---|---|
| 0039773 | of 1981 | European Pat. Off. . |
| 0161767 | of 1985 | European Pat. Off. . |
| 0185112 | of 1986 | European Pat. Off. . |
| 62-216920 | 6/1987 | Japan . |
| 2026998 | 2/1980 | United Kingdom ............ 252/62.59 |
| 2137797 | 4/1984 | United Kingdom ............ 428/403 |

Primary Examiner—Merrell C. Cashion, Jr.
Assistant Examiner—Robert J. Follett
Attorney, Agent, or Firm—Nixon & Vanderhye

[57] ABSTRACT

Disclosed herein are plate-like composite ferrite particles for magnetic recording comprising plate-like composite ferrite containing Ba particles having a composition represented by $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, in which Ba exists in the composition at a linear concentration gradient between the surface and the nucleation portion of said particles, and a process for producing such plate-like composite ferrite particles.

6 Claims, 2 Drawing Sheets

PLATE-LIKE COMPOSITE FERRITE PARTICLES FOR MAGNETIC RECORDING AND PROCESS FOR PRODUCING THE SAME

BACKGROUND OF THE INVENTION

The present invention relates to plate-like composite ferrite particles which have an appropriate coercive force, a large magnetization and a narrow coercive force distribution, plate-like composite ferrite particles which further has a large anisotropy field, and a process for producing such plate-like composite ferrite particles.

As described, for example, in Japanese Patent Application Laid-Open No. 55-86103(1980), ferromagnetic non-acicular particles having a large magnetization, an appropriate coercive force and an appropriate average particle size have recently been demanded as a magnetic recording material, in particular, as a perpendicular magnetic recording material.

Generally, Ba ferrite particles are known as ferromagnetic non-acicular particles.

A method of autoclaving an aqueous alkaline suspension containing Ba ions and Fe(III) by using an autoclave as a reaction apparatus (this method is hereinunder referred to as "autoclaving method") is hitherto known as a process for producing plate-like Ba ferrite.

With respect to the magnetic properties of plate-like Ba ferrite particles suitable for magnetic recording, a coercive force of about 300 to 2,000 Oe is generally required, and in order to reduce the coercive force of the plate-like Ba ferrite particles produced in the autoclaving method to an appropriate coercive force, a method of substituting a part of Fe(III) in the ferrite by Co(II), Ti(IV) or the ions of a divalent metal such as Mn, Zn and Ni has been proposed.

The magnetization of plate-like Ba ferrite particles must be as large as possible, as is described in Japanese Patent Application Laid-Open (KOKAI) No. 56-149328 (1981) ". . . the magneto plumbite ferrite which is used as a magnetic recording material is required to have the greatest possible saturation magnetization. . . ". As a method of enhancing the magnetization of plate-like Ba ferrite particles, for example, a method of bring zinc into solid solution on the surfaces of the plate-like Ba ferrite particles is known [Japanese Patent Application Laid-Open (KOKAI) No. 62-176918 (1987)].

The particle size of plate-like Ba ferrite particles suitable for magnetic recording is required to be as fine as possible, in particular, to be not greater than 0.3 μm. This fact is described, for example, in Japanese Patent Application Laid-Open (KOKAI) No. 56-125219 (1981) ". . . perpendicular magnetic recording is effective in relation to horizontal recording in the region in which the recording wavelength is not more than 1 μm. In order to sufficiently record and reproduce in this wavelength region, the crystalline particle diameter of the ferrite is preferably substantially not greater than 0.3 μm. However, if the particle diameter is about 0.01 μm, the desired coercive force tends to be not exhibited. Therefore, a crystalline-particle diameter of 0.01 to 0.3 μm is appropriate".

There is no end to the recent demand for the improvement of the properties of plate-like Ba ferrite particles, and plate-like Ba ferrite particles having a narrow coercive force distribution in addition to an appropriate coercive force, a large magnetization and an appropriate particle size, as described above are strongly required.

The reason for the demand for a narrow coercive force distribution is that plate-like Ba ferrite particles are apt to have a wide distribution of coercive force due to the non-uniformity of the ingredients, thereby deteriorating the erasing characteristic, as described in the *Reports of Technical Researches of the Institute of Electronics and Communication Engineers of Japan* MR 77-36 (1978) "Co-doped magnetic iron oxide particles have a serious defect in that when they are formed into a tape, the print through and the erasing characteristic are inferior because the coercive force of the particles is apt to change with heat and with time. These defects are considered to be caused by the fact that the Co ions move in the crystals even at room temperature", and in Japanese Patent Application Laid-Open (KOKAI) No. 61-17426 (1986) ". . . It has been found that as the $\gamma$-$Fe_2O_3$ particles become finer, the coercive force distribution is enlarged and that the coercive force distribution has a tendency of being further enlarged when the particles are coated with cobalt. . . . Even if the cobalt-coated $\gamma$-$Fe_{O3}$ particles are made finer for the purpose of high-density recording, a magnetic powder having a bad coercive force distribution and deteriorated erasing characteristic in spite of a predetermined coercive force (Hc). . . ".

Further, plate-like Ba ferrite particles having a large anisotropy field in addition to a narrow coercive force distribution are strongly required.

The reason for the demand for a large anisotropy field is that such a large anisotropy field enables high-density recording without lowering the output even in a high-frequency band.

This fact is described, for example, *High-density Memory Technique and Materials* (1984), pp. 67 to 68 "FIGS. 2, 3 and 12 shows the relationship between output and wavelength obtained by recording/reproducing with a ring head by using a Co-Cr single-layer medium having a large anisotropic perpendicular magnetic field (Hk). An excellent high-density recording characteristic such as $D_{50}=135$ KBPI is obtained. . . ".

As a method of enhancing the magnetization of plate-like composite Ba ferrite particles, for example, a method of modifying the surfaces of the plate-like composite Ba ferrite particles by spinel ferrite (Japanese Patent Application Laid-Open (KOKAI) Nos. 60-255628 (1985), 60-255629 (1985), 62-139121 (1987), 62-139122 (1987), 62-139123 (1987) and 62-139124 (1987), and U.S. Pat. No. 4,584,242), and a method of solid-solving zinc in the neighbourhood of the surfaces of plate-like composite Ba ferrite particles in the form of a solid solution (Japanese Patent Application Laid-Open (KOKAI) Nos. 62-176918 (1987), 62-265121 (1987) and 63-2812 (1988) are conventionally known.

Plate-like Ba ferrite particles having an appropriate coercive force, a large magnetization, an appropriate, particle size, a narrow coercive force distribution and a large anisotropy field have now been strongly demanded, but plate-like Ba ferrite particle obtained by the above-described, known method of improving the magnetization show a maximum magnetization. In addition, according to the former known method, the anisotropy field is as small as about 2 to 3 KOe and according to the latter known method, the coercive force distribution is disadvantageously wide.

Thus, the establishment of a process for producing plate-like composite ferrite containing Ba particles having a large magnetization and a narrow coercive force distribution is now in strong demand.

As a result of various researches on a process for producing plate-like composite ferrite containing Ba particles having a large magnetization and a narrow coercive force distribution, it has been found that the plate-like composite ferrite containing Ba particles obtained by mixing an aqueous solution of a ferric salt, Ba salt and M salts, wherein M represents at least one metal (II) selected from the group consisting of Co, Ni, Zn, Mn and Mg and at least one metal (IV) selected from the group consisting of Ti, Sn, Zr and Ge, and an aqueous alkaline solution in a temperature range of 50° to 150° C. to produce fine alkaline mixture particles, filtering out the fine alkaline mixture particles, washing them with water, calcining (heat-treating them in a temperature range of 300° to 600° C., suspending the heat-treated fine particles in an aqueous solution containing Fe, Zn and metals M to produce a suspension of less than pH 4, adding an aqueous alkaline solution to the suspension to produce a suspension of not less than pH 4 containing the heat-treated fine particles with a hydroxide of Fe, Zn and the metal M precipitated on the surface thereof, filtering out and drying the obtained fine particles, and calcining (heat-treating) them in a temperature range of 800° to 1,100° C. in the presence of a flux, have a large magnetization and a narrow coercive force distribution. The present invention has been achieved on the basis of this finding.

SUMMARY OF THE INVENTION

In a first aspect of the present invention, there is provided plate-like composite ferrite particles for magnetic recording comprising plate-like composite ferrite containing Ba particles having a composition represented by $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, in which Ba exists in the composition at a linear concentration gradient between the surface and the nucleation portion of the particles.

In a second aspect of the present invention, there is provided plate-like composite ferrite particles for magnetic recording comprising plate-like composite ferrite containing Ba particles having a composition represented by $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, in which Ba exists in the composition at a linear concentration gradient between the surface and the nucleation portion of the particles, and the surfaces of which are coated with Co ferrite represented by the following formula:

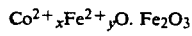

$$Co^{2+}{}_xFe^{2+}{}_yO \cdot Fe_2O_3$$

wherein $0 < x \leq 1$, $0 \leq y < 1$, and $0 < x+y \leq 1$.

In a third aspect of the present invention, there is provided a process of producing plate-like composite ferrite particles for magnetic recording, comprising the steps of: mixing an aqueous solution of a ferric salt, Ba salt and M salts, wherein M represents at least one metal (II) selected from the group consisting of Co, Ni, Zn, Mn and Mg and at least one metal (IV) selected from the group consisting of Ti, Sn, Zr and Ge, and an aqueous alkaline solution in a temperature range of 50° to 150° C. to produce fine alkaline mixture particles; filtering out the fine alkaline mixture particles; washing the fine particles with water; heat-treating the fine particles in a temperature range of 300° to 600° C.; suspending the heat-treating fine particles in an aqueous solution containing Fe, Zn and metals M to produce a suspension of less than pH 4; adding an aqueous alkaline solution to the suspension to produce a suspension of more than pH 4 containing the heat-treated fine particles with a hydroxide of Fe, Zn and the metals M precipitated on the surface thereof; filtering out and drying the fine particles with the hydroxide precipitated on the surface thereof; and heat-treating the fine particles in a temperature range of 800° to 1,100° C. in the presence of a flux to obtain plate-like composite ferrite containing Ba particles defined in the first aspect.

In a fourth aspect of the present invention, there is provided a process of producing plate-like composite ferrite particles comprising steps of: mixing an aqueous solution of a ferric salt, Ba salt and M salts, wherein M represents at least one metal (II) selected from the group consisting of Co, Ni, Zn, Mn and Mg and at least one metal (IV) selected from the group consisting of Ti, Sn, Zr and Ge, and an aqueous alkaline solution in a temperature range of 50° to 150° C. to produce fine alkaline mixture particles; filtering out the fine alkaline mixture particles; washing the fine particles with water; heat-treating the fine particles in a temperature range of 300° to 600° C.; suspending the heat-treated fine particles in an aqueous solution containing Fe, Zn and metals M to produce a suspension of less than pH 4; adding an aqueous alkaline solution to the suspension to produce a suspension of more than pH 4 containing the heat-treated fine particles with a hydroxide of Fe, Zn and the metals M precipitated on the surface thereof; filtering out and drying the fine particles with the hydroxide precipitated on the surface thereof; heat-treating the fine particles in a temperature range of 800° to 1,100° C. in the presence of a flux to obtain plate-like composite ferrite containing Ba particles defined in the first aspect; mixing the plate-like composite ferrite containing Ba particles with an alkaline suspension of pH 8.0 to 14.0 which contains 1.0 to 35.0 atomic % of $Co^{2+}$ or $Co^{2+}$ and $Fe^{2+}$ based on the total amount of Fe(II), Fe(III), the metal (II) and the metal (IV) is the particles; and heat-treating the mixed suspension at a temperature of 50° to 100° C. to obtain the plate-like composite ferrite containing Ba particles with the surfaces thereof coated with Co ferrite defined in the second aspect.

BRIEF DESCRIPTION OF THE DRAWINGS

FIGS. 1 to 4 show the concentration of Ba between the surface (the point of 0 wt%) to the center (the point of 100 wt. %) of the particles, wherein FIGS. 1 to 3 show the concentrations of Ba of the plate-like composite ferrite particles obtained in Examples 1 to 3, respectively, and FIG. 4 shows that of the plate-like composite ferrite particles obtained in Comparative Example 1.

DETAILED DESCRIPTION OF THE INVENTION

Figure 1:
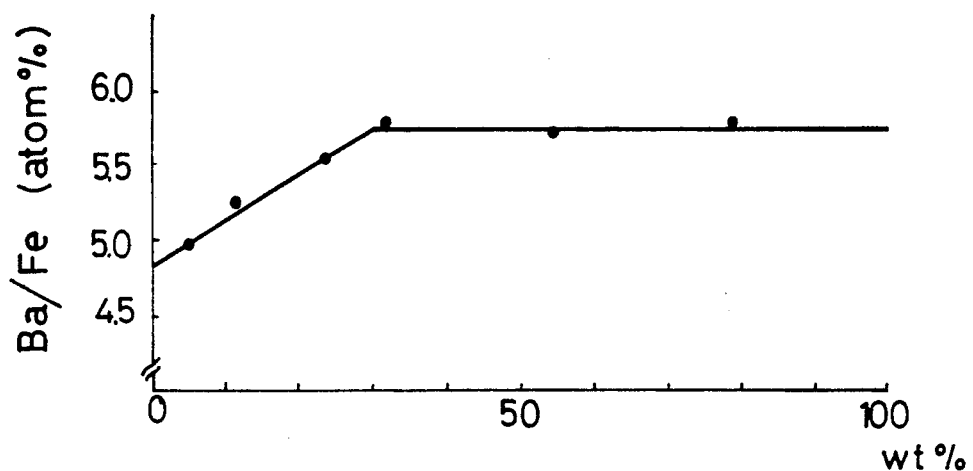

The plate-like composite ferrite particles for magnetic recording according to the present invention comprise plate-like composite ferrite containing Ba particles having a composition represented by $19 < (Fe+M)/Ba \leq 22$, wherein M represents at least one metal (II)

selected from the group consisting of Co, Ni, Zn, Mn and Mg and at least one metal (IV) selected from the group consisting of Ti, Sn, Zr and Ge, and Ba exists in the composition at a linear concentration gradient between the surface to the center of the particle, obtained by mixing an aqueous solution of a ferric salt, Ba salt and M salts, wherein M represents at least one metal (II) selected from the group consisting of Co, Ni, Zn, Mn and Mg and at least one metal (IV) selected from the group consisting of Ti, Sn, Zr and Ge and an aqueous alkaline solution in a temperature range of 50° to 150° C. to produce fine alkaline mixture particles, filtering out the fine alkaline mixture particles, washing them with water, heat-treating them in a temperature range of 300° to 600° C., suspending the heat-treated fine particles in an aqueous solution containing Fe, Zn and metals M to produce a suspension of less than pH 4, adding an aqueous alkaline solution to the suspension to produce a suspension of not less than pH 4 containing the heat-treated fine particles with a hydroxide of Fe, Zn and the metals M precipitated on the surface thereof, filtering out and drying the fine particles with the hydroxide precipitated thereon, and heat-treating them in a temperature range of 800° to 1,100° C. in the presence of a flux. As a result, the plate-like composite ferrite containing Ba particles according to the present invention have a large magnetization and a narrow coercive force distribution. Furthermore, by coating the surfaces of the thus-obtained plate-like composite ferrite containing Ba particles with Co ferrite ($Co^{2+}_x Fe^{2+}_y O \cdot Fe_2O_3$, wherein $0 < x \leq 1$, $0 \leq y < 1$, and $0 < x+y \leq 1$), it is possible to obtain plate-like composite ferrite containing Ba particles having a larger magnetization, a narrower coercive force distribution and a large anisotropy field.

In the plate-like composite ferrite containing Ba particles according to the present invention, Ba exists with a positive linear concentration gradient between the surface and the nucleation portion of the particle, as shown in later-described examples. The quantity of the portion of the particle in which Ba exists with a positive linear concentration gradient is 10 to 60 wt. %, preferably 15 to 50 wt. %.

The reason why Ba is present therein on a linear concentration gradient in the present invention is not clear, but since a divalent metal in the composition other than Ba has a negative concentration gradient, which is opposite to that of Ba, the present inventors consider that Ba is substituted by the divalent metal.

The present inventors consider that the reason why the coercive force distribution is narrow in the present invention is that Ba exists uniformly in the plate-like composite ferrite containing Ba particles as is clear from the linear concentration of Ba. The switching field distribution (hereinunder referred to as "S.F.D.") value of the plate-like composite ferrite containing Ba particles according to the present invention is not more than 2.0, preferably not more than 1.7, more preferably not more than 1.5.

The magnetization of the plate-like composite ferrite containing Ba particles according to the present invention is not less than 55 emu/g, preferably not less than 57–58 emu/g, more preferably not less than 60 emu/g.

The present inventors consider that the reason why a larger magnetization is obtained by coating the surfaces of the plate-like composite ferrite containing Ba particles obtained in accordance with the present invention with Co ferrite is that the sufficiently dense and orderly epitaxial growth of Co ferrite is produced on the surfaces of the plate-like composite ferrite containing Ba particles, thereby fully manifesting the effect of enhancing the magnetization.

The reason why the sufficiently dense and orderly epitaxial growth is produced in the present invention is not clear but it is conjectured that Ba is scarce in the neighbourhood of the particle surfaces due to the concentration gradient thereof in the plate-like composite ferrite containing Ba particles and, as a result, the crystals of the plate-like composite ferrite containing Ba particles in the neighbourhood of the particle surfaces assumes not a magnetoplumbite structure, which is intrinsic to the plate-like composite ferrite containing Ba particles, but a structure close to the spinel structure, thereby accelerating the epitaxial growth of Co ferrite, which also has a spinel crystalline structure.

When plate-like composite ferrite containing Ba particles are coated with magnetite which is spinel type ferrite, the anisotropy field is generally reduced. However, the plate-like composite ferrite containing Ba particles coated with Co ferrite in accordance with the present invention have a large anisotropy field. The reason for this is not clear, but the present inventors consider that it is due to the synergistic effect of using specific plate-like composite ferrite containing Ba particles as the particles being treated and coating the particles with Co ferrite.

As the ferric salt in the present invention, ferric nitrate, ferric chloride, etc. are usable.

As the Ba salt in the present invention, a hydroxide, a nitrate, a chloride and the like of Ba are usable.

As the metal (II) salt in the present invention, the nitrate, chloride and the like of a metal selected from the group consisting of Co, Ni, Zn, Mn and Mg are usable.

The amount of metal (II) salt added is 2 to 15 atomic% based on the ferric iron. If it is less than 2 atomic%, the coercive force thereof becomes more than 2000 Oe, so that it is difficult to obtain plate-like composite ferrite particles suitable for magnetic recording. If it is more than 15 atomic%, the coercive-force thereof becomes less than 300 Oe or the magnetization thereof becomes less than 55 emu/g, so that it is also difficult to obtain plate-like composite ferrite particles suitable for magnetic recording.

As the metal (IV) salt in the present invention, the chloride, sulfate, nitrate and the like of a metal selected from the group consisting of Ti, Sn, Zr and Ge are usable. The amount of metal (IV) salt added is 2 to 15 atomic% based on the ferric iron. If it is less than 2 atomic%, the coercive force thereof becomes more than 2000 Oe, so that it is difficult to obtain plate-like composite ferrite particles suitable for magnetic recording. If it is more than 15 atomic%, the coercive force thereof becomes less than 300 Oe or the magnetization thereof becomes less than 55 emu/g, so that it is also difficult to obtain plate-like composite ferrite particles suitable for magnetic recording.

The ratio of the metal (IV) salt to the metal (II) salt is not more than 1 [metal (IV)/metal (II) $\leq 1$].

The reaction temperature for producing the fine alkaline mixture particles in the present invention is 50° to 150° C. Even if the temperature is lower than 50° C., the fine alkaline mixture particles can be produced but the reaction takes a long time. If the temperature exceeds 150° C., the size of the fine alkaline mixture particles becomes too large, so that it is difficult to obtain plate-like composite ferrite particles suitable for magnetic recording. When the reaction temperature is not lower than 100° C., it is preferable to use an autoclave or the like.

The temperature for heat-treating the fine alkaline mixture particles after they are washed with water is 300° to 600° C. If it is lower than 300° C., the production of ferrite at the nucleation portion of the composite ferrite particles of the present invention is insufficient. On the other hand, if it exceeds 600° C., Ba in the composition of the plate-like composite ferrite particles obtained does not exhibit the linear concentration gradient and as a result, it is difficult to obtain a good S.F.D. value.

On the surfaces of the heat-treated fine particles, a hydroxide of Fe, Zn and the metals M is precipitated. The hydroxide is produced by reacting salts containing Fe, Zn and the metals M with an alkali. The Fe salt may be either a ferrous salt or a ferric salt. As the ferrous salt, ferrous nitrate, ferrous chloride, ferrous sulfate and the like are usable. As the ferric salt, the various ferric salts described above are usable. As the Zn salt, Zn halides such as zinc chloride, zinc bromide and zinc iodide, zinc nitrate, zinc sulfate and zinc acetate are usable.

The amounts of Fe salt, Zn salt and salts of the metals M added are determined so that the composition of the plate-like composite ferrite particles obtained is in the range of $19 < (Fe+M)/Ba \leq 22$. If the value of (Fe+M)/Ba exceeds 22, the plate-like composite ferrite particles disadvantageously include $\alpha$-Fe$_2$O$_3$. On the other hand, if it is less than 19, the magnetization of the plate-like composite ferrite particles obtained becomes small.

The pH of the alkaline suspension of the heat-treated fine particles and an aqueous solution containing Fe, Zn and the metals M is less than 4. If it is not less than 4, a Zn hydroxide is singly separated from the other components, so that it is difficult to precipitate the Zn hydroxide uniformly on the surface of the heat-treated fine particles.

By adding an aqueous alkaline solution to the suspension having a pH of less than 4 to obtain the suspension having a pH of not less than 4, it is possible to precipitate a hydroxide of Fe, Zn and the metals M on the surfaces of the heat-treated fine particles. If the pH of the suspension exceeds 12, a produced hydroxide of zinc or the like happens to dissolve.

The temperature of 800° to 1,100° C. at which the heat-treated fine particles with a hydroxide of Fe, Zn and the metals M precipitated on the surface thereof is heat-treated is required for the process for growing the fine particles to ferrite particles. A temperature of lower than 800° C. is insufficient for the reaction for producing ferrite particles. If the temperature is higher than 1,100° C., the growth of the particles are so rapid as to make the particles coarse, so that it is difficult to obtain plate-like composite ferrite particles suitable for magnetic recording.

It is necessary to use a flux in the heat-treating process. As the flux, at least one selected from the group consisting of a halide or sulfate of an alkali metal, a halide or sulfate of an alkali earth metal and sodium ortho silicate is usable. For example, as halide of an alkali metal KCl and NaCl are usable. As halide of alkali earth metal, BaCl$_2$ and SrCl$_2$ are usable. The amount of flux used is 3 to 400 wt. % based on the heat-treated fine particles. If it is less than 3 wt. %, particles are unfavorably sintered between each other during heat-treating.

Addition of more than 400 wt. % of a flux can also achieve the aim of the present invention, but it is meaningless to add a flux more than necessary.

The flux is washed from the particles with water or an aqueous solution such as hydrochloric acid, acetic acid and nitric acid.

The Co-ferrite coating in the present invention is carried out by mixing plate-like composite ferrite containing Ba particles which are to be treated, with an alkaline suspension containing Co alone or both Co and Fe.

As the Co salt, cobalt sulfate, cobalt chloride, cobalt nitrate and the like are usable.

As the Fe salt, ferrous sulfate, ferrous chloride, ferrous nitrate and the like are usable.

The amount of Co salt used or the amount of Co salt and Fe salt used is 1.0 to 35.0 atomic%, atomic% based on the total amount of Fe(III), metal (II) and metal (IV) in the plate-like composite ferrite containing Ba particles. If it is less than 1.0 atomic%, the effect of cobalt coating is insufficient. On the other hand, if it is more than 35 atomic%, Co ferrite is disadvantageously singly separated from the other components.

The mixing order of plate-like composite ferrite containing Ba particles and an alkaline suspension containing Co or Co and Fe is not specified, either may be added to the other or both may be mixed with each other simultaneously.

The pH of the alkaline suspension is 8.0 to 14.0. If the pH is less than 8.0, the suspension is unsuitable for a hydroxide of Co$^{2+}$ or Co$^{2+}$ and Fe$^{2+}$ to exist in a stable state. Since a hydroxide of Co$^{2+}$ or Co$^{2+}$ and Fe$^{2+}$ exists in a stable state and the Co ferrite production reaction is brought about so long as the suspension is strongly alkaline, a pH of not more than 14.0 is sufficient for achieving the object of the present invention in consideration of the industrial and economical efficiency..

The heating temperature of the alkaline suspension is 50° to 100° C. If it is lower than 50° C., it is difficult to produce Co ferrite from a hydroxide of Co$^{2+}$ or Co$^{2+}$ and Fe$^{2+}$. Although the Co ferrite production reaction is brought about even at a temperature higher than 100° C., the temperature of 100° C. is sufficient for achieving the object of the present invention because the reaction is carried out in an aqueous solution.

The plate-like composite ferrite containing Ba particles according to the present invention have a particle diameter of 0.01 to 0.3 $\mu$m, a coercive force of 300 to 2,000 Oe, a large magnetization such as not less than 55 emu/g, preferably not less than 57 emu/g, a narrow coercive force distribution such as an S.F.D. value of not more than 2.0 and a composition represented by $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, and contains Ba existing at a linear concentration gradient between the surface and the nucleation portion of the particles. Thus, the plate-like composite ferrite containing Ba particles according to the present invention are highly suitable as a magnetic material for magnetic recording.

In addition, the plate-like composite ferrite containing Ba particles according to the present invention have a particle diameter of 0.01 to 0.3 $\mu$m, a coercive force of 300 to 2,000 Oe, a large magnetization such as not less than 58 emu/g, preferably not less than 60 emu/g, a narrow coercive force distribution such as an S.F.D value of not more than 2.0 a large anisotropy filed such as not less than 3.6 KOe, preferably not less than 3.8 KOe and a composition represented by $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, and contains Ba existing at a linear concentration gradient between the surface and the nucleation portion of the particles, and the surfaces of which are coated with Co ferrite represented by the following formula:

$$Co^{2+}{}_x Fe^{2+}{}_y O \cdot Fe_2O_3$$

wherein $0 < x \leq 1$, $0 \leq y < 1$, and $0 < x+y \leq 1$.

Thus, the plate-like composite ferrite containing Ba particles according to the present invention are highly suitable as a magnetic material for magnetic recording.

EXAMPLE

The present invention will be explained with reference to the following examples and comparative examples.

In the following examples and comparative examples, the average particle diameter is a value obtained from electron microphotograph.

The coercive force distribution is represented by the S.F.D. (switching field distribution) value, and the smaller the S.F.D. value is, the narrower is the coercive force distribution. The S.F.D. value was obtained by measuring the half width of the differentiation curve of Hc obtained by using the differentiation circuit of a magnetic measuring instrument, and by dividing the half width by Hc of the peak value of the curve.

An anisotropy field (Hk) is represented by the value obtained by a method described on page 3433, left column, line 21 to right column, line 10 of *Journal of Applied Physics* vol. 63, No. 8 (1988). That is, coordinates (ordinate: Wr, abscissa: 1/H) were produced by plotting the value of energy loss Wr (Rotational Hysteresis Loss) obtained from the torque curve which is obtained when a sample is rotated by 360° by using a torque magnetometer (Model 1600, produced by DIGITAL MEASUREMENT SYSTEM, INC.) with respect to the reciprocal 1/H of the magnetic field (H). The inclined portion of the curve which has the largest inclination to the abscissa was taken out and the value of the point at which the extension of the inclined portion crosses the abscissa 1/H was assumed to be the anisotropy field (Hk). Each sample was produced by applying a kneaded mixture of plate-like composite Ba ferrite particles and an epoxy resin to paper.

EXAMPLE 1

14.0 mol of $Fe(NO_3)_3$, 1.21 mol [equivalent to 8.64 atomic % based on Fe(III)] of $Co(NO_3)_2$, 0.38 mol [equivalent to 2.71 atomic % based on Fe(III)] of $TiCl_4$, 1.11 mol of $Ba(OH)_2$ [(Fe+M)/Ba=14.0 atomic%] and 166 mol of NaOH were heated to 120° C. in an autoclave and maintained at 120° C. for 2 hours while being mechanically stirred, whereby the fine particles of the alkaline mixture were precipitated.

After the autoclave was cooled to room temperature, the fine alkaline mixture particles were filtered out, thoroughly washed with water, dried and then heat-treated at 450° C.

100 g of the heat-treated fine particles were dispersed in an aqueous solution containing 0.47 mol of $FeCl_2$, 0.058 mol of $ZnCl_2$, 0.048 mol of $Co(NO_3)_2$ and 0.014 mol of $TiCl_4$. After the thus obtained suspension having a pH of 3.5 was stirred for 0.5 hour, NaOH was added thereto until the pH of the suspension became 7.1, whereby a hydroxide of Fe(II), Zn, Co and Ti was precipitated on the surfaces of the particles. The heat-treated fine particles with the hydroxide precipitated thereon were filtered out and dried.

An aqueous solution containing 100 g (equivalent to 200 wt. % based on the heat-treated fine particles) of a flux of NaCl was added to 50 g of the heat-treated fine particles with the hydroxide of Fe(II), Zn, Co and Ti precipitated on the surfaces thereof, and after evaporating the water, the fine particles were heat-treated at 850° C. for 1.5 hours in air.

Through X-ray fluorometry, it was found that the fine particles obtained by heat-treating had a composition of [Fe+Zn(II)+Co (II)+Ti (IV)]/Ba=21.1. The average particle diameter was 0.06 μm according to the observation under an electron microphotograph, the coercive force (Hc) was 620 Oe, the magnetization (σs) was 64.4 emu/g, and S.F.D. value was 1.27.

50 g of the thus-obtained plate-like composite ferrite containing Ba particles were immersed in 1l of 1N aqueous hydrochloric acid solution, and the quantity of Ba ions in the aqueous hydrochloric acid solution was measured by chemical analysis after the passage of every predetermined period to obtain the Ba concentration in the particles.

The Ba concentration is shown in FIG. 1. From FIG. 1, it was observed that Ba in the composition had a linear concentration gradient between the surface of the particles and the nucleation portion and, hence, Ba existed uniformly.

The abscissa in FIG. 1 represents the distance from the surface (the point of 0 wt. %) to the center (the point of 100 wt. %) of the particles, and ordinate represents the ratio of Ba to Fe.

EXAMPLE 2

14.0 mol of $Fe(NO_3)_3$, 0.75 mol [equivalent to 5.36 atomic % based on Fe(III)] of $CoCl_2$, 0.41 mol equivalent to 2.93 atomic % based on Fe(III)] of $TiCl_4$, 0.92 mol of $Ba(OH)_2$ [(Fe+M)/Ba=16.5 atomic %] and 164 mol of NaOH were heated to 130° C. in an autoclave and maintained at 130° C. for 2 hours while being mechanically stirred, whereby the fine alkaline mixture particles were precipitated.

After the autoclave was cooled to room temperature, the fine alkaline mixture particles were filtered out, thoroughly washed with water, dried and then heat-treated at 500° C.

100 g of the heat-treated fine particles were dispersed in an aqueous solution containing 0.1 mol of $FeCl_2$, 0.3 mol of $FeCl_3$, 0.051 mol of $ZnCl_2$, 0.009 mol of $CoCl_2$ and 0.004 mol of $TiCl_4$. After the thus obtained suspension having a pH of 3.9 was stirred for 0.5 hour, NaOH was added thereto until the pH of the suspension became 7.5 whereby a hydroxide of Fe(II), Fe(III), Zn, Co and Ti was precipitated on the surfaces of the particles. The heat-treated fine particles with the hydroxide precipitated thereon were filtered out and dried.

An aqueous solution containing 100 g (equivalent to 200 wt. % based on the heat-treated fine particles) of a flux of NaCl was added to 50 g of the heat-treated fine particles with the hydroxide of Fe(II), Fe(III), Zn, Co and Ti precipitated on the surfaces thereof, and after drying, the fine particles were heat-treated at 820° C. for 2 hours in air.

Through X-ray fluorometry, it was found that the fine particles obtained by heat-treating had a composition of [Fe+Zn(II)+Co (II)+Ti (IV)]/Ba=19.3. The average particle diameter was 0.05 μm according to the observation under an electron microphotograph, the coercive force (Hc) was 890 Oe, the magnetization (σs) was 62.6 emu/g, and S.F.D. value was 0.78.

The concentration of Ba existing in 50 g of the thus-obtained plate-like composite ferrite containing Ba particles was obtained in the same was as in Example 1.

Figure 2:
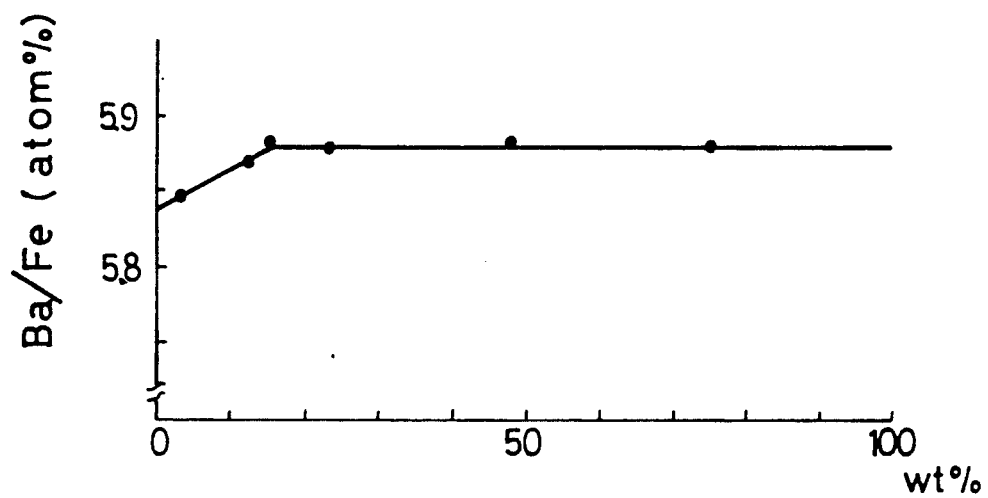

The Ba concentration is shown in FIG. 2. From FIG. 2, it was observed that Ba in the composition had a linear concentration gradient between the surface of the particles and the nucleation portion and, hence, Ba existed uniformly.

EXAMPLE 3

14.0 mol of Fe(NO$_3$)3, 0.83 mol [equivalent to 5.92 at% based on Fe(III)] of NiCl$_2$, 0.44 mol [equivalent to 3.14 at% based on Fe(III)]of TiCl$_4$, 1.66 mol of BaCl$_2$ [(Fe+M)/Ba=9.20 atomic %] and 165 mol of NaOH were heated to 100° C. in an autoclave and maintained at 100° C. for 2 hours while being mechanically stirred, whereby the fine alkaline mixture particles were precipitated.

After the autoclave was cooled to room temperature, the fine alkaline mixture particles were filtered out, thoroughly washed with water, dried and then heat-treated at 400° C.

100 g of the heat-treated fine particles were dispersed in an aqueous solution consisting of 1.05 mol of FeCl$_3$, 0.060 mol of ZnCl$_2$, 0.088 mol of NiCl$_2$ and 0.031 mol of TiCl$_4$. After the thus obtained suspension having a pH of 2 was stirred for 0.5 hours, NaOH was added thereto until the pH of the suspension became 8.2, whereby a hydroxide of Fe(II), Zn, Ni and Ti was precipitated on the surfaces of the particles. The heat-treated fine particles with the hydroxide precipitated thereon were filtered out and dried.

An aqueous solution containing 100 g (equivalent to 200 wt. % based on the heat-treated fine particles) of a flux of BaCl$_2$ was added to 50 g of the heat-treated fine particles with the hydroxide of Fe(II), Zn, Ni and Ti precipitated on the surfaces thereof, and after drying, the fine particles were heat-treated at 950° C. for 0.5 hour in air.

Through X-ray fluorometry, it was found that the fine particles obtained by heat-treating had a composition of [Fe+Zn(II)+Ni (II)+Ti (IV)]/Ba=20.2. The average particle diameter was 0.06 μm according to the observation under an electron microphotograph, the coercive force (Hc) was 1092 Oe, the magnetization (σs) was 60.5 emu/g, and S.F.D. value was 1.08.

The concentration of Ba existing in 50 g of the thus obtained plate like composite ferrite containing Ba particles was obtained in the same was as in Example 1.

Figure 3:
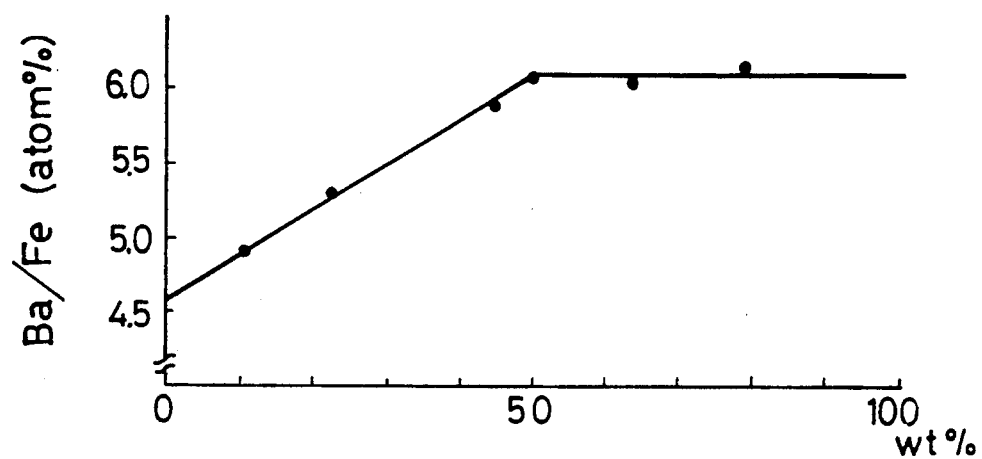

The Ba concentration is shown in FIG. 3. From FIG. 3, it was observed that Ba in the composition had a linear concentration gradient between the surface of the particles and the nucleation portion and, hence, Ba existed uniformly.

COMPARATIVE EXAMPLE 1

Plate-like Ba ferrite particles containing 9.50 atomic % of Ba, 8.25 atomic % of Co and 2.86 atomic % of Ti based on Fe were obtained by autoclaving method.

100 g of the particles obtained were dispersed in 0.07 mol of an aqueous Zn chloride solution to prepare a suspension of pH 7.1, in which a Zn hydroxide was precipitated on the surface of the particles, which were then filtered out and dried.

To 50 g of the thus-obtained plate-like Ba ferrite particles with the Zn hydroxide precipitated on the surfaces thereof, an aqueous solution containing 100 g (equivalent to 200 wt. % based on the plate-like composite Ba ferrite particles) of a flux of NaCl was added, and after evaporating the water, the particles were heat-treated at 850° C. for 1.5 hours in air.

Through X-ray fluorometry, it was found that the fine particles obtained by heat-treating had a composition of [Fe+Zn(II)+Co (II)+Ti (IV)]/Ba=16.6. The average particle diameter was 0.06 μm according to the observation under an electron microphotograph, the coercive force (Hc) was 650 Oe, the magnetization (σs) was 63.5 emu/g, and S.F.D. value was 2.1.

Figure 4:
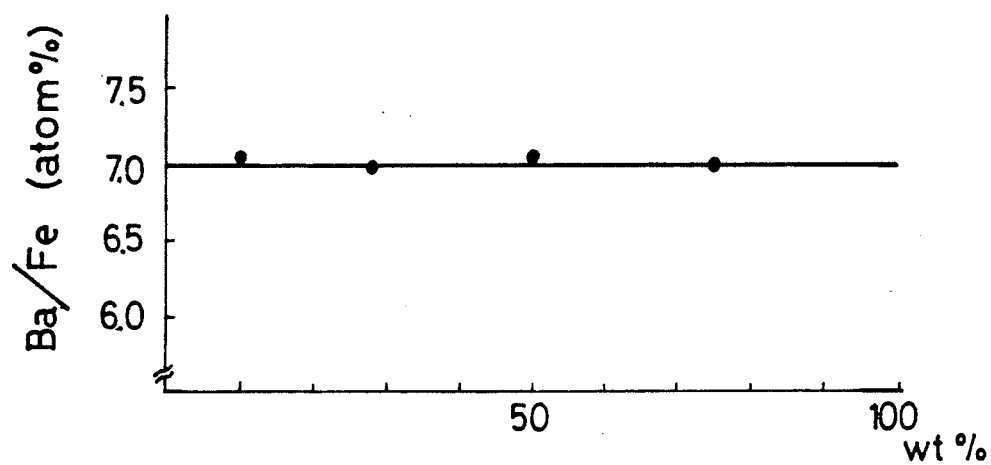

The Ba concentration of the particles is shown in FIG. 4. As is clear from FIG. 4, no Ba concentration gradient was observed.

EXAMPLE 4

100 g of the plate-like composite ferrite containing Ba particles obtained in Example 1 and an alkaline suspension containing 0.47 mol of Fe(OH)$_2$ and 0.052 mol of Co(OH$_2$) were mixed with each other [the amount of Fe(II) and Co(II) was equivalent to 34.6 atomic% based on the total amount of Fe(III), metal (II) and metal (IV)], and the total volume of mixed suspension was adjusted to 2.0 l by adding water. The resultant mixed suspension having a pH of 12.0 was then heated to 80° C. and stirred at 80° C. for 1.0 hour, thereby producing a black brown precipitate. The black brown precipitate was filtered out, washed with water, treated with acetone and dried at room temperature.

The black brown particles obtained had an average particle diameter of 0.06 μm according to the observation through an electron microphotograph. In the X-ray diffraction pattern, a peak of Ba ferrite and a peak of Co ferrite was observed.

As to the magnetic characteristics of the black brown particles, the coercive force (Hc) was 505 Oe, the magnetization (σs) was 69.9 emu/g, the anisotropy field (Hk) was 4.7 KOe and S.F.D. value was, 1.50.

EXAMPLE 5

100 g of the plate-like composite ferrite containing Ba particles obtained in Example 2 and an alkaline suspension containing 0.11 mol of Fe(OH)$_2$ and 0.026 mol of Co(OH$_2$) were mixed with each other [the amount of Fe(II) and Co(II) was equivalent to 8.10 atomic % based on the total amount of Fe(III), metal (II) and metal (IV)], and the total volume of mixed suspension was adjusted to 2.0 l by adding water. The resultant mixed suspension having a pH of 12.5 was then heated to 90° C. and stirred at 90° C. for 1.0 hour, thereby producing a black brown precipitate. The black brown precipitate was filtered out, washed with water, treated with acetone and dried at room temperature.

The black brown particles obtained had an average particle diameter of 0.05 μm according to the observation through an electron microphotograph. In the X-ray diffraction pattern, a peak of Ba ferrite and a peak of Co ferrite was observed.

As to the magnetic characteristics of the black brown particles, the coercive force (Hc) was 90 Oe, the magnetization (σs) was 65.8 emu/g, the anisotropy field (Hk) was 4.3 KOe and S.F.D. value was 1.00.

EXAMPLE 6

100 g of the plate-like composite ferrite containing Ba particles obtained in Example 2 and an alkaline suspension containing 0.42 mol of Fe(OH)$_2$ and 0.10 mol of Co(OH$_2$) were mixed with each other [the amount of Fe(II) and Co(II) was equivalent to 34.2 atomic % based on the total amount of Fe(III), metal (II) and metal (IV)], and the total volume of mixed suspension was adjusted to 2.0 l by adding water. The resultant mixed suspension having a pH of 12.5 was then heated to 90° C. and stirred at 90° C. for 1.0 hour, thereby producing a black brown precipitate. The black brown precipitate was filtered out, washed with water, treated with acetone and dried at room temperature.

The black brown particles obtained had an average particle diameter of 0.05 μm according to the observation through an electron microphotograph. In the X-ray diffraction pattern, a peak of Ba ferrite and a peak of Co ferrite was observed.

As to the magnetic characteristics of the black brown particles, the coercive force (Hc) was 710 Oe, the magnetization (σs) was 68.0 emu/g, the anisotropy field (Hk) was 4.0 KOe and S.F.D. value was 1.18.

EXAMPLE 7

100 g of the plate-like composite ferrite containing Ba particles obtained in Example 3 and an alkaline suspension containing 0.29 mol of Fe(OH)$_2$ and 0.10 mol of Co(OH$_2$) were mixed with each other [the amount of Fe(II) and Co(II) was equivalent to 25.7 atomic % based on the total amount of Fe(III), metal (II) and metal (IV)], and the total volume of mixed suspension was adjusted to 2.0 l by adding water. The resultant mixed suspension having a pH of 11.5 was then heated to 85° C. and stirred at 85° C. for 1.5 hours, thereby producing a black brown precipitate. The black brown precipitate was filtered out, washed with water, treated with acetone and dried at room temperature.

The black brown particles obtained had an average particle diameter of 0.05 μm according to the observation through an electron microphotograph. In the X-ray diffraction pattern, a peak of Ba ferrite and a peak of Co ferrite was observed.

As to the magnetic characteristics of the black brown particles, the coercive force (Hc) was 905 Oe, the magnetization (σs) was 66.0 emu/g, the anisotropy field (Hk) was 3.8 KOe and S.F.D. value was 1.20.

COMPARATIVE EXAMPLE 2

The plate-like Ba ferrite particles obtained in Comparative Example 1 were treated in the same way as in Example 4, thereby obtaining black brown particles with Co ferrite produced on the surfaces thereof.

The black brown particles obtained had an average particle diameter of 0.06 μm according to the observation through an electron microphotograph. In the X-ray diffraction pattern, a peak of Ba ferrite and a peak of Co ferrite was observed.

As to the magnetic characteristics of the black brown particles, the coercive force (Hc) was 520 Oe, the magnetization (σs) was 66.5 emu/g, the anisotropy field (Hk) was 3.5 KOe and S.F.D. value was 2.30.

What is claimed is:

1. Plate shaped composite ferrite particles for magnetic recording comprising plate shaped composite ferrite containing Ba particles having a composition represented by the formula $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, said plate shape composite ferrite particles having an outer region, in which Ba exists in this region in a linear concentration gradient increasing between the surface, where Ba is present in the lowest concentration, and wherein as the Ba concentration increases the M(II) concentration decreases, and a center nucleation portion, where the Ba concentration is substantially constant, the outer region representing from 10 to 60 wt. % of said particles, said nucleation portion, representing from 90 to 40 wt. % of said particles, contains from 2 to 15 atomic % of M(II) based on the ferric iron and independently 2 to 5 atomic % of M(IV) based on the ferric iron, provided in the nucleation portion of the ratio of M(IV) to M(II) is not more than 1 [M(IV)/M(II) $\leq$ 1].

2. The plate shaped composite ferrite particles according to claim 1, wherein said surfaces of said plate shaped composite ferrite particles are coated with 1.0 to 35.0 atomic %, based on the total amount of Fe(III), metal (II) and metal (IV) in the plate shaped composite ferrite containing Ba particles, of Co ferrite represented by the formula:

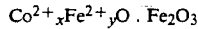

$$Co^{2+}{}_xFe^{2+}{}_yO \cdot Fe_2O_3$$

wherein $0 < x \leq 1$, $0 \leq y < 1$, and $0 < x+y \leq 1$.

3. The plate shaped composite ferrite particles according to claim 1, wherein said particles have an average particle diameter of 0.01 to 0.3 μm, a coercive force of 300 to 2,000 Oe, a magnetization of not less than 55 emu/g, and a switching field distribution value of not more than 2.0.

4. The plate shaped composite ferrite particles according to claim 2, wherein said particles have an average particle diameter of 0.01 to 0.3 μm, a coercive force of 300 to 2,000 Oe, a magnetization of not less than 58 emu/g, a switching field distribution value of not more than 2.0, and an anisotrophy field of not less than 3.6 KOe.

5. A process of producing plate-like composite ferrite particles for magnetic recording, said process comprising the steps of:

(a) mixing an aqueous solution of a ferric salt, Ba salt and M salts, wherein M represents at least one metal (II) selected from the group consisting of Co, Ni, Zn, Mn and Mg and at least one metal (IV) selected from the group consisting of Ti, Sn, Zr and Ge, and an aqueous alkaline solution at a temperature in the range of 50° to 150° C. to produce a precipitate of fine alkaline mixture particles;

(b) filtering out and removing said fine alkaline mixture particles from the aqueous solution resulting from step (a);

(c) washing said fine particles with water;

(d) heat-treating said fine particles at a temperature in the range of 300° to 600° C.;

(e) suspending the heat-treated fine particles in an aqueous solution containing Fe, Zn and metals M to produce a suspension of less than pH 4;

(f) adding an aqueous alkaline solution to said suspension to produce a suspension of more than pH 4 containing said heat-treated fine particles with an hydroxide of Fe, Zn and the metals M precipitated on the surface thereof;

(g) filtering out, removing and drying said fine particles with said hydroxide precipitated on the surface thereof; and (h) adding an aqueous solution of a flux to the particles and heat-treating said fine particles in a temperature in the range of 800° to 1,100° C. in the presence of the flux, said flux selected from the group consisting of a halide or sulfate of an alkali metal, a halide or sulfate of an alkali earth metal and sodium orthosilicate, in an amount of 3 to 400 wt. %, based on the heat-treated fine particles, to obtain plate-like composite ferrite particles for magnetic recording comprising plate shaped composite ferrite containing Ba particles having a composition represented by the formula $19 < (Fe+M)/Ba \leq 22$, wherein M represents at least one metal (II) selected from the group consisting of Co, Ni, Zn, Mn and Mg and at least one metal (IV) selected from the group consisting of Ti, Sn, Zr and Ge, said plate shaped composite ferrite particles having an outer region, in which Ba exists in this region in a linear concentration gradient increasing between the surface, where Ba is present in the lowest concentration, and wherein as the Ba concentration increases the M(II) concentration decreases, and a center nucleation portion, where the Ba concentration is substantially constant, the outer region representing from 10 to 60 wt. % of said particles, said nucleation portion, representing from 90 to 40 wt. % of said particles, contains from 2 to 15 atomic % of M(II) based on the ferric iron and independently 2 to 5 atomic % of M(IV) based on the ferric iron, provided in the nucleation portion the ratio of M(IV) to M(II) is not more than 1 [M(IV)/M(II) $\leq$ 1].

6. The process according to claim 5 further including the steps of:

(i) mixing said plate shaped composite ferrite particles obtained by heat-treating said fine particles in a temperature range of 800° to 1,100° C. in the presence of a flux as in step (h) with an alkaline suspension of pH 8.0 to 14.0 which contains 1.0 to 35.0 atomic % of $Co^{2+}$ or 1.0 to 35.0 atomic % of $Co^{2+}$ plus $Fe^{2+}$ both based on the total amount of Fe(III), $M^{II}$ and $M^{IV}$ in said particles; and thereafter (j) heat-treating the resulting mixed suspension at a temperature of 50° to 100° C. to obtain plate shaped composite ferrite particles whose surfaces are coated with Co ferrite of the formula $$Co^{2+}{}_xFe^{2+}{}_yO \cdot Fe_2O_3$$

wherein $0 < x \leq 1$, $0 \leq y < 1$, and $0 < x+y \leq 1$.

* * * * *